O. THIEME.
CALCULATING MACHINE.
APPLICATION FILED APR. 17, 1913.

1,100,929.

Patented June 23, 1914.

7 SHEETS—SHEET 1.

Witnesses;
J. Adolph Bishop
O. S. Butler

Inventor;
By Otto Thieme,
F. R. Cornwall
Atty.

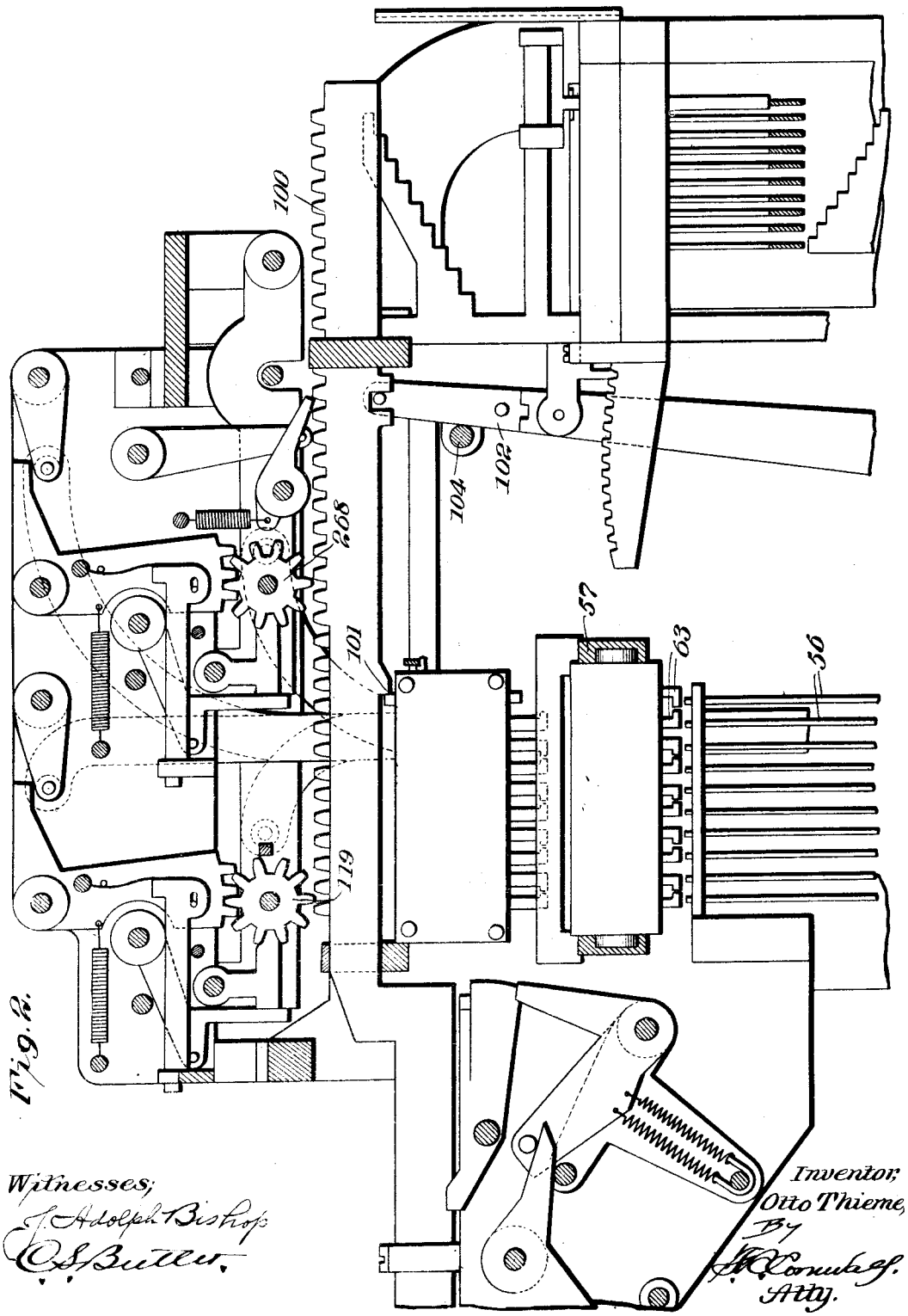

O. THIEME.
CALCULATING MACHINE.
APPLICATION FILED APR. 17, 1913.
1,100,929.
Patented June 23, 1914.
7 SHEETS—SHEET 3.
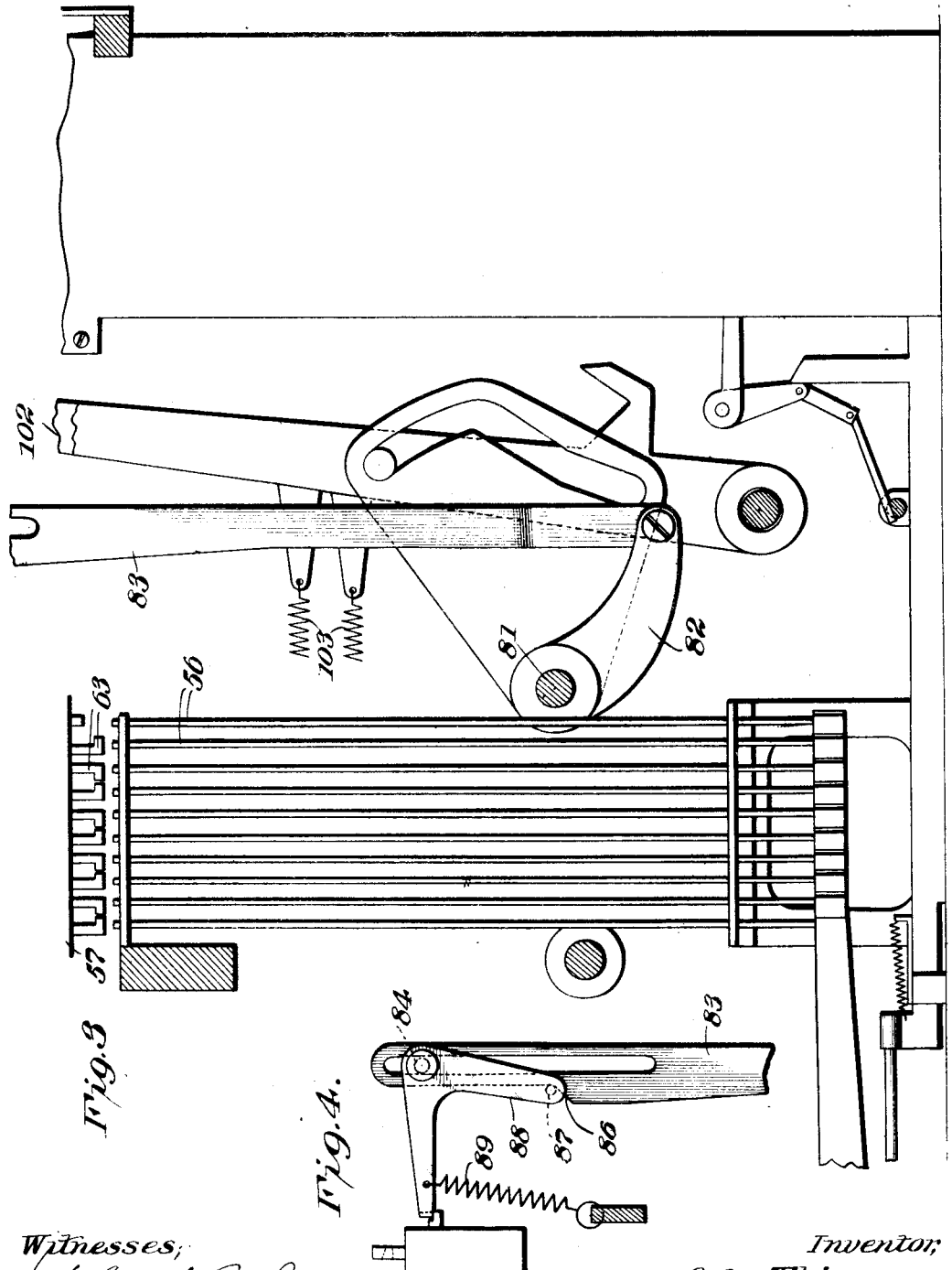
Witnesses:
J. Adolph Bishop.
Inventor:
Otto Thieme,
Atty.

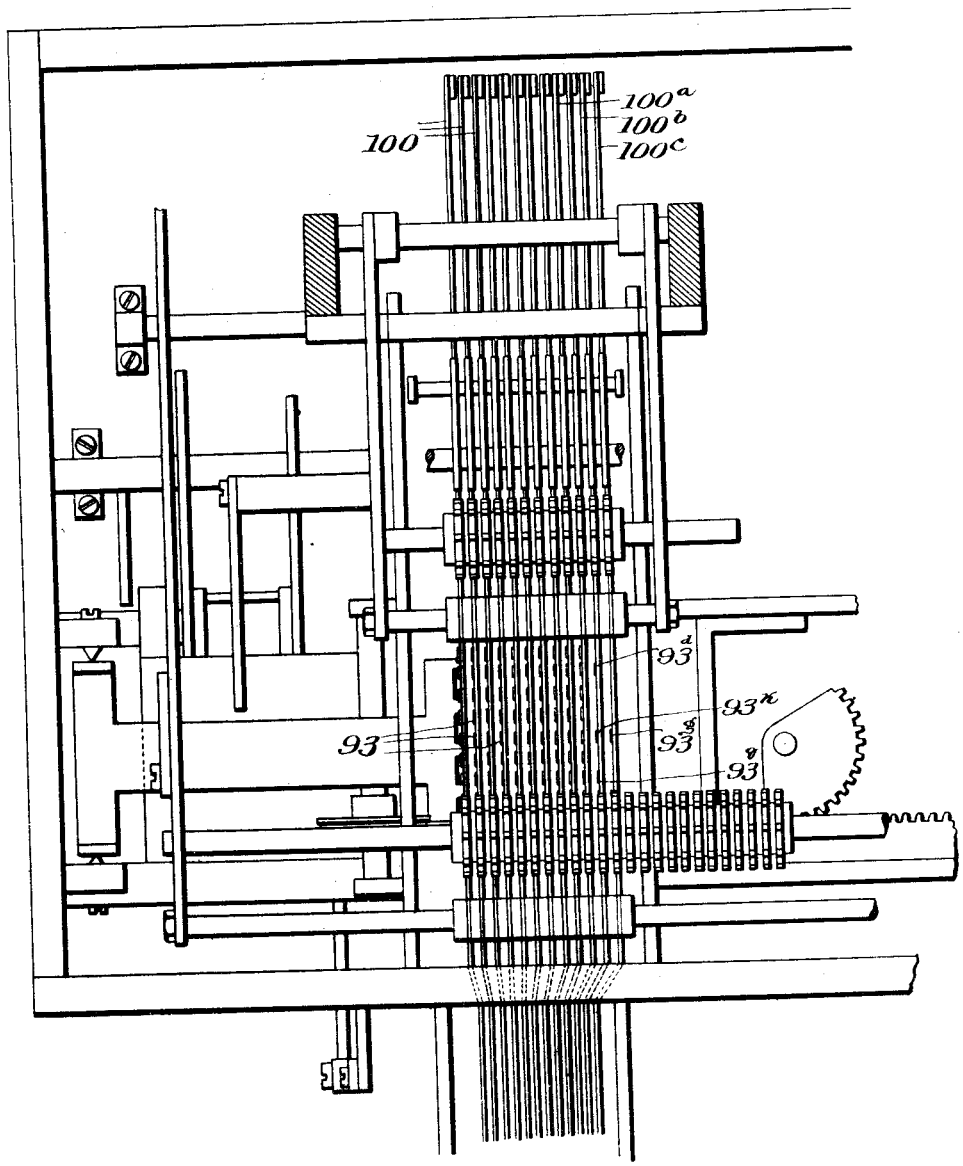

O. THIEME.
CALCULATING MACHINE.
APPLICATION FILED APR. 17, 1913.

1,100,929.

Patented June 23, 1914.
7 SHEETS—SHEET 5.

Witnesses;

Inventor,
Otto Thieme,
Atty.

O. THIEME.
CALCULATING MACHINE.
APPLICATION FILED APR. 17, 1913.
1,100,929.
Patented June 23, 1914.
7 SHEETS—SHEET 6.
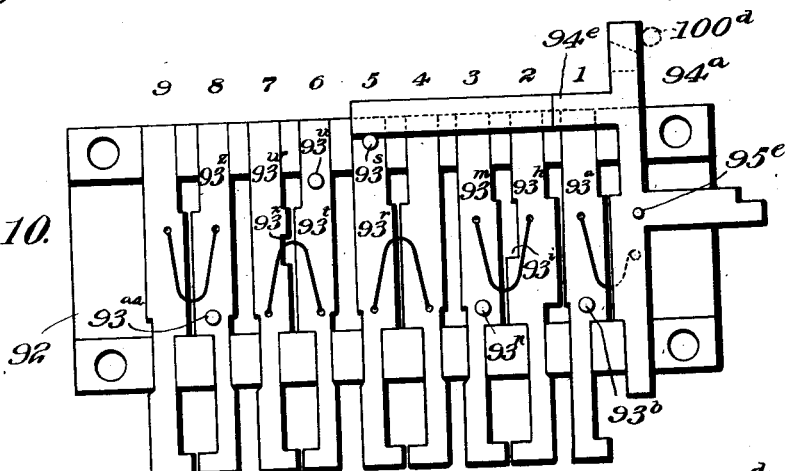
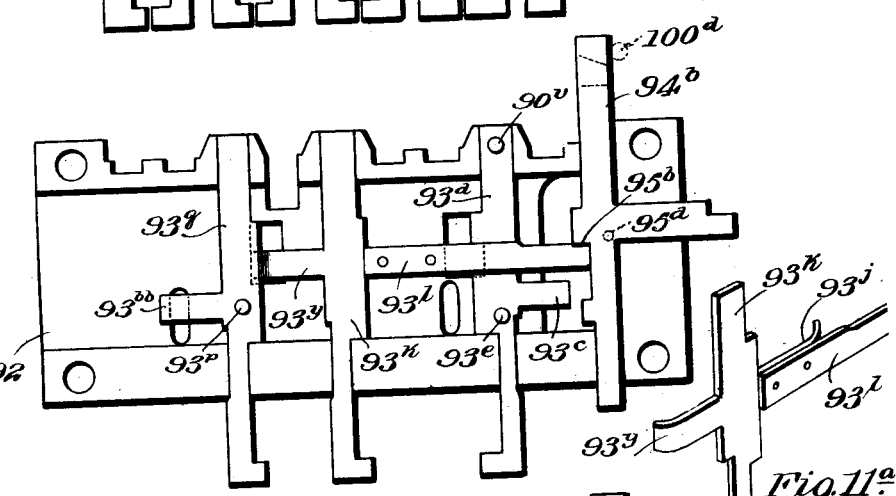
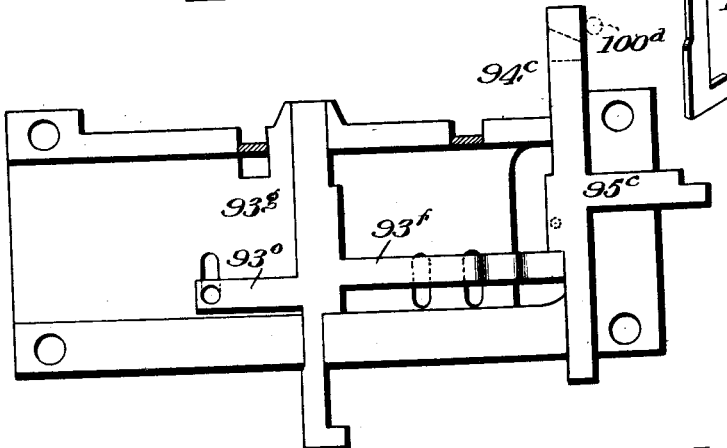
Witnesses:
J. Adolph Bishop.
C. S. Butler.
Inventor,
Otto Thieme,
By F. C. Cornwall,
Atty.

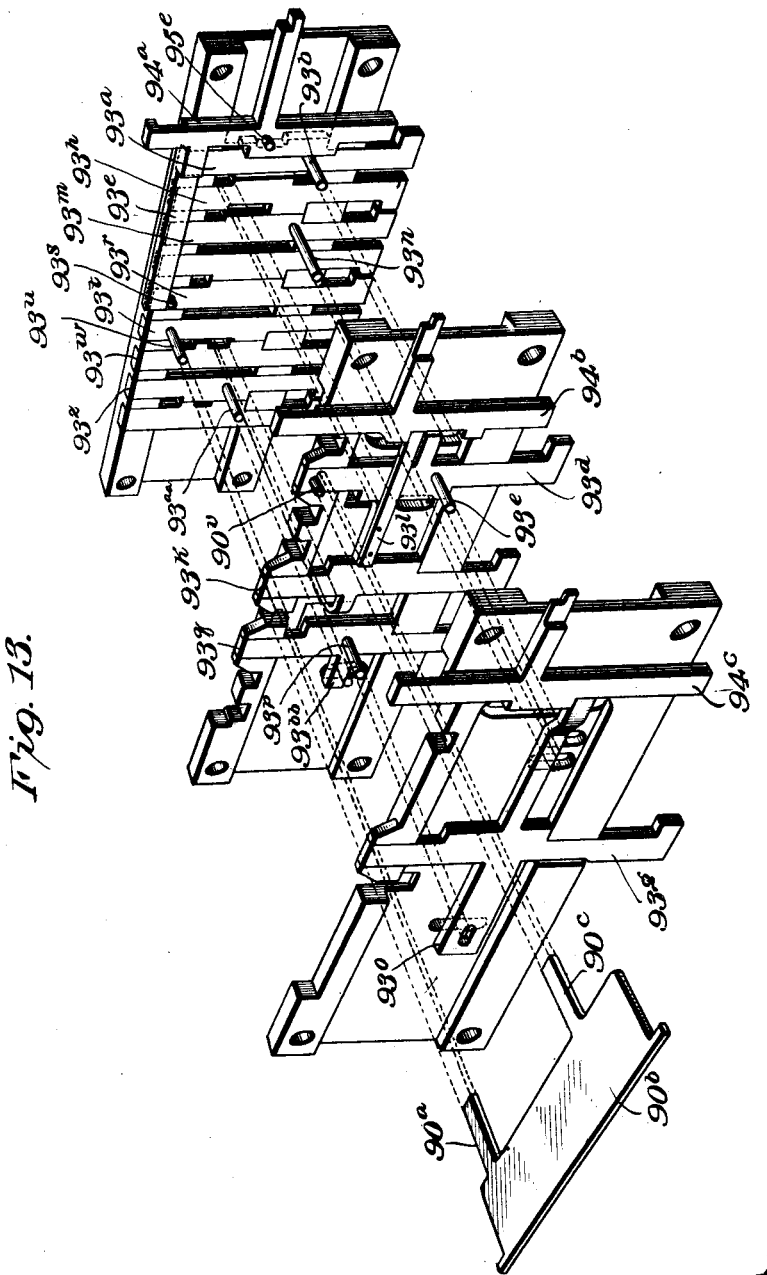

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,100,929.  Specification of Letters Patent.  Patented June 23, 1914.

Application filed April 17, 1913. Serial No. 761,841.

*To all whom it may concern:*

Be it known that I, OTTO THIEME, a citizen of the United States, residing at the city of St. Louis, State of Missouri, have invented certain new and useful Improvements in Calculating-Machines, of which the following is a full, clear, and exact description, such as will enable others skilled in the art to which it appertains to make and use the same, reference being had to the accompanying drawings, forming part of this specification, in which—

Figure 1:
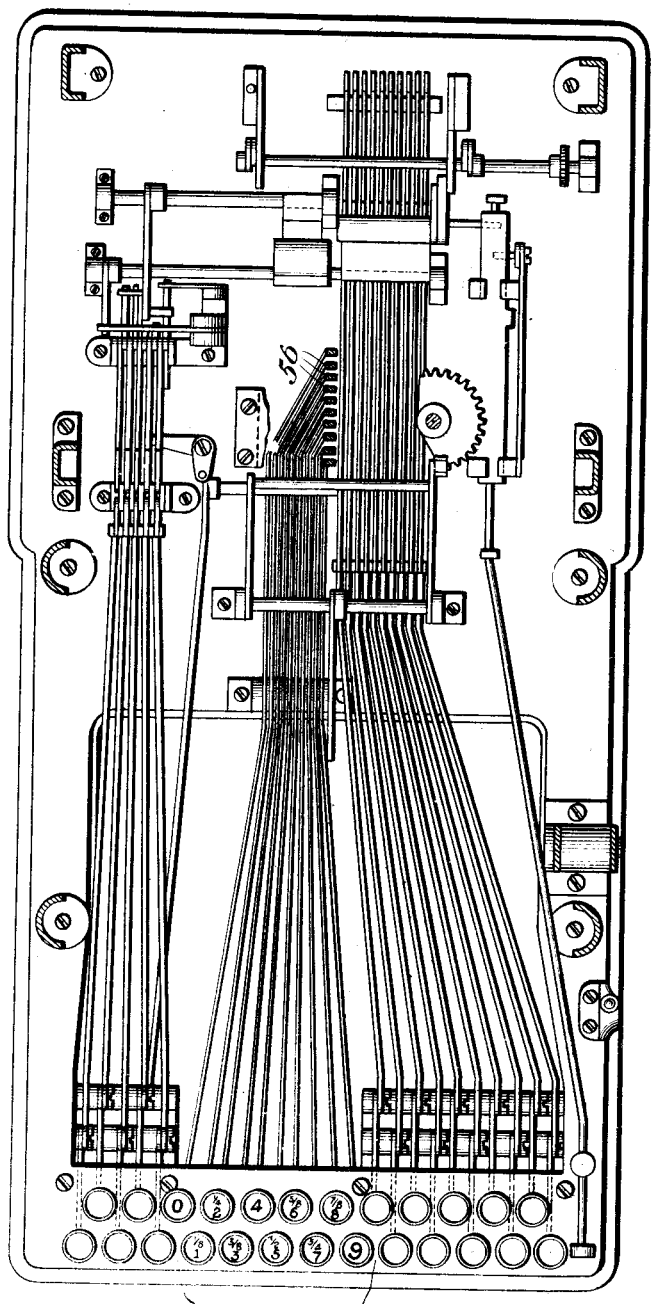
Figure 6:
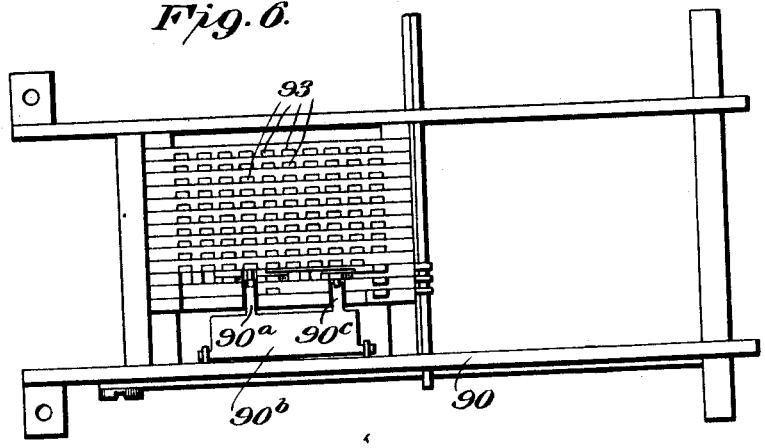
Figure 7:
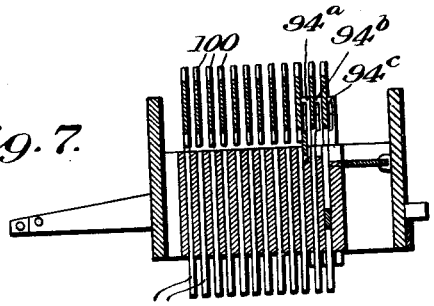
Figure 8:
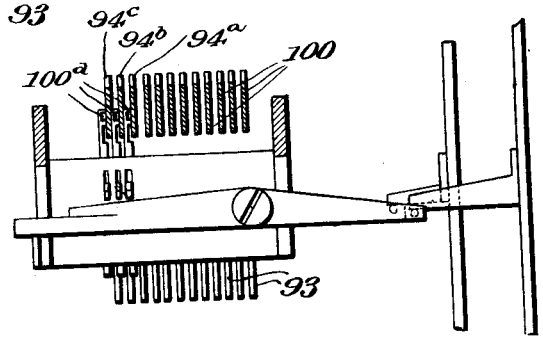
Figure 9:

Figure 1 is a plan view showing the keyboard arrangement of my improved calculating machine. Fig. 2 is an enlarged vertical sectional view through the rear upper portion of the machine. Fig. 3 is a similar view through the lower rear portion of the machine. Fig. 4 is a detail view of the upper end of one of the levers shown in Fig. 3. Fig. 5 is a top plan view of the adding mechanism with certain of the parts removed. Fig. 6 is a top plan view of the stationary field of stops. Fig. 7 is a vertical cross sectional view through said stationary field of stops. Fig. 8 is an end elevational view of said stationary field of stops. Fig. 9 is a detail view of the upper end of one of the decimal rack stop pins. Fig. 10 is an enlarged view of the stop pins which control the tenths decimal rack. Fig. 11 is a detail view of the stop pins which control the hundredths decimal rack. Fig. 11ª is a detail view of one of said pins. Fig. 12 is a detail view of the stop pins which control the thousandths decimal rack. Fig. 13 is a diagrammatic illustration showing the manner of controlling the hundredths and thousandths stop pins when certain tenths stop pins are operated.

This invention relates to a new and useful improvement in calculating machines, and it is designed as an improvement upon the calculating machines shown in the Belgian patent to Hubert Hopkins, No. 202,081, dated August 21, 1907, French Patent No. 383,719, dated January 16, 1908, and on the application for U. S. Letters Patent filed by Hubert Hopkins April 9, 1906, Serial No. 310,739.

My present invention is designed particularly to provide means in a calculating machine for decimally computing fractions, such as halves, quarters and eighths, without requiring the setting up on the keyboard of all the digits represented in the decimal.

Referring to Fig. 1, it will be seen that the digit keys in group A which are operated to introduce numbers into the adding mechanism, are provided with characters on the key buttons representing whole numbers and fractions, as for instance the "1" key bears the fraction ⅛; the "2" key bears the fraction ¼, etc. In operating the machine of the Belgian patent before mentioned, when any of the digit keys in group A is depressed, the rear ends of the key bars will lift the vertical bars 56 (see Fig. 3) and position stop pins 63 in a laterally movable carriage 57. This carriage advances leftwardly as each key is struck to locate the positioned pins 63 under the stop pins 93 in a stationary field of stops. When the main operating shaft 81 is rocked, the levers 102 connected to the racks 100 are pulled forward by their springs 103, being permitted to move forward by the restoring bar 104. Shoulders 101 on the racks will contact with the pins 93 which have been raised. These pins 93 in the stationary field of stops are raised at the beginning of the movement of the rock shaft 81 by the bodily lifting of the carriage 57 with its key positioned pins 63. When shaft 81 reaches the limit of its forward rocking movement, the register wheels 119 are drawn down into mesh with the racks and when the restoring bar 104 returns the racks to their home position, the number set upon the keyboard will be introduced into the wheels 119. Of course, totals can be obtained from the wheels 119, numbers can be primarily introduced into the wheels 268 and totals thereof taken, etc., all of which is described in the Belgian patent mentioned, but which form no part of my present invention. When the D or decimal key in the Belgian patent referred to is depressed, it will disable the escapement mechanism which controls the leftward movement of the carriage 57, and, consequently, the depression of any of the digit keys in group A, when the D key is depressed, will operate one of the decimal stop pins shown in Fig. 10, and when one of these decimal stop pins is positioned, the absence of any stepping movement of the carriage to the left will place the positioned decimal pin in control of the tenths decimal rack bar.

In the construction shown in the Belgian patent referred to, there are no fractions on the digit keys and hence it was only possible after depressing the D key and striking one of the decimal keys to compute tenths of a unit. My present invention is an extension of the decimal arrangement disclosed in the Belgian patent, and I provide two additional decimal racks, to wit, hundredths and thousandths decimal racks, and control their movement by appropriate stop pins which are lifted to decimally represent eighths of a unit. It is, of course, understood that where the denominator of a fraction is 8, it may be expressed decimally as follows:

$$\begin{align}
\tfrac{1}{8} \text{ equals } &.125 \\
\tfrac{1}{4} \text{ ”} \quad &.25 \\
\tfrac{3}{8} \text{ ”} \quad &.375 \\
\tfrac{1}{2} \text{ ”} \quad &.5 \\
\tfrac{5}{8} \text{ ”} \quad &.625 \\
\tfrac{3}{4} \text{ ”} \quad &.75 \\
\tfrac{7}{8} \text{ ”} \quad &.875
\end{align}$$

Assuming that it is desired to decimally compute any one of the above fractions, either by adding them together in the wheels 119, or by multiplying them by the multiplying mechanism described in said Belgian patent, I will now proceed to describe the operation of my improved mechanism with the understanding that whole numbers, of course, may be computed, and when the fractions are to be computed, the D key is depressed first to arrest the leftward movement of the carriage 57 for reasons before described and the digit key containing the proper fraction then operated, after which the rock shaft 81 is operated.

If it is desired to introduce $\tfrac{1}{8}$ (.125) the D key is depressed and the "1" digit key also containing the character $\tfrac{1}{8}$ is then depressed, which will result in lifting the "1" pin in the traveling carriage 57. As the carriage will not advance leftwardly, the "1" pin in carriage 57 will remain under the tenths decimal stop pins shown in Fig. 10 and consequently, when the carriage is lifted it will position the "1" tenths decimal stop pin 93$^a$. This pin 93$^a$ has a lateral projection 93$^b$ which extends through a slot in the guide plate 92 and under an arm 93$^c$ on the "2" hundredths stop pins 93$^d$. Hence when the "1" pin in the tenths row is elevated to control a tenths decimal rack bar, it will also lift the "2" pin in the hundredths row to control the hundredths decimal stop pin. The "2" pin in the hundredths row also has a lateral projection 93$^e$ which extends through a slot in the guide plate 92 under an arm 93$^f$ connected to the thousandths decimal stop pin 93$^g$ so that whenever the "2" pin in the hundredths row is raised, it will also raise the "5" pin in the thousandths row.

From the above, it will be seen that after the D key is depressed and the "1" digit key is depressed to introduce the decimal equivalent to the fraction $\tfrac{1}{8}$ into the machine, the "1" pin in the carriage 57 will elevate the "1" pin in the tenths row which in turn will lift the "2" pin in the hundredths row and the "2" pin will lift the "5" pin in the thousandths row, and these pins will arrest the forward movement of the tenths, hundredths and thousandths decimal racks 100$^a$, 100$^b$, and 100$^c$ respectively. (See Fig. 5.)

As the decimal rack bars are not prevented from forward movement by positioning the zero stop pins 93, as is done in the case of the rack bars which compute whole numbers, I provide said decimal rack bars with pins 100$^d$ (see Fig. 8) which normally lie behind posts 94$^a$, 94$^b$ and 94$^c$ in the tenths, hundredths and thousandths orders. These posts are recessed on one side nearest their pins 100$^d$, as shown in Fig. 9, and when they are lifted, they, or some of them, depending upon the number of rack bars to be released, will permit the pins to pass through their respective recesses, thus enabling the decimal racks to move forward. In the present instance, it is necessary to lift all of the posts, as all three rack bars must move forward and this is accomplished as follows: The arm 93$^f$ on the thousandths "5" pin extends under a shoulder on the thousandths rack bar post 94$^c$, which in turn is provided with a pin 95$^c$, said pin extending under a shoulder 95$^b$ on the hundredths post, which latter is provided with a pin 95$^d$ which extends under a pin 95$^e$ on the tenths post. Hence, as it is necessary to raise all three posts whenever the "5" pin 93$^g$ in the thousandths column is raised, the operation of said thousandths "5" pin will do this in the manner above described. In order to return these rack releasing posts to their normal position, I provide a rock arm 82 on the shaft 81 and mount a link 83 thereon, which link is slotted at its upper end and guided on a pin 84. Cam face 86 coöperates with a pin 87 on the lower end of a bell crank lever 88 whose opposite end extends over arms extending rearwardly from the posts, and as the pin 87 drops off the high part of the cam, the end of the bell crank lever will engage said arm and force the posts downwardly in front of the pins 100$^d$ so as to latch the decimal rack bars in their home position. A spring 89 is connected to the bell crank lever to effect this. Of course, it is understood that at the commencement of the operation of the machine, the bell crank 88 will be locked to release the posts before the carriage 57 is lifted and just before the shaft 81 reaches its home position, the bell crank will be operated to restore the posts to normal position, and prevent their accidental displacement.

The next fraction to be computed decimally is ¼, and by referring to Fig. 1 it will be seen that this character appears on the "2" digit key. This means that the "2" stop pin in the tenths decimal row will be elevated upon the operation of the machine to introduce the decimal equivalent to the fraction ¼ therein, and that it is also necessary to operate the "5" stop pin in the hundredths row. The "2" key 93$^h$ shown in Fig. 10 is provided with a shoulder 93$^i$ which is located under the bent end of an arm 93$^j$ extending from the "5" pin 93$^k$ in the hundredths column. This arm 93$^j$ also has secured to it a piece 93$^l$ which extends under the shoulder 95$^b$ of the post 94$^b$ so that when the "2" stop pin of the tenths column is raised, the "5" pin in the hundredths column is also raised and the "5" pin will raise its rack releasing post 94$^b$, which will in turn release the rack releasing post 94$^a$. Rack releasing post 94$^c$ is not raised, but remains in its normal position to prevent movement of the thousandths rack bar.

To decimally compute the fraction ⅜, the next in order, the key having this character in the keyboard is depressed in the manner above described, and this will raise the "3" stop pin 93$^m$ in the tenths order, which as shown in Fig. 10 is provided with a pin 93$^n$ extending through registering slots in the guide plates 92 and under the arm 93$^f$ of the "5" pin in the thousandths column. The last mentioned pin carries a lateral projection 93$^o$ which has an opening to receive the pin 93$^p$ on the "7" stop pin 93$^q$ in the hundredths order. Thus, whenever the "5" pin in the thousandths order is raised, the "7" pin in the hundredths order will also be raised, even when ⅛ is being introduced into the machine, but in the introduction of ⅛ (.125) into the machine, the hundredths rack bar will contact with the "2" stop pin in the hundredths order before it reaches the "7" stop pin in the same order which is simultaneously positioned, and hence the elevation of the "7" stop pin will not interfere with the proper operation of the machine. In the present instance, however, in introducing ⅜ (.375) in the machine, the "2" pin in the hundredths order is not raised. As stated before, when the "5" pin in the thousandths order is raised, all of the rack releasing posts will be elevated.

The next fraction is ½, which, decimally expressed is .5. Therefore, it is only necessary to raise "5" pin in the tenths order and at the same time lift only the rack releasing post 94$^a$. "5" pin in the tenths order is indicated at 93$^r$ and carries a pin 93$^s$ under an arm 94$^e$ extending forwardly from the post 94$^a$ so that when thousandths "5" pin is raised, the rack releasing post will also be raised.

The next fraction is ⅝, which, decimally expressed is .625. The "6" pin 93$^t$ in the tenths order is raised. This pin has a lateral projection 93$^u$ which extends under the prong 90$^a$ of a plate 90$^b$ pivotally mounted on the stationary frame plate 90. (See Fig. 6.) This pivoted plate has another prong 90$^c$ which extends under the pin 90$^v$ on the "2" stop pin in the hundredths order, and as before stated, when the "2" pin in the hundredths column is raised, as it will be when the "6" stop pin in the tenths column is raised, said "2" pin will, by virtue of pin 93$^e$ engaging the arm 93$^f$, also raise the "5" pin in the thousandths order.

The next fraction, ¾ (.75) involves the raising of the "7" stop pin in the tenths order which is provided with a notch 93$^x$ for engaging the bent end of an arm 93$^y$ on the "5" stop pin in the hundredths order. Thus, whenever the "7" stop pin in the tenths order is raised, it will also raise the "5" stop pin in the hundredths order.

The next higher fraction is ⅞ (.875). This involves the raising of the "8" stop pin 93$^z$ in the tenths order which has a lateral projection 93$^{aa}$ extending through a slot in the frame plate 92 and under an arm 93$^{bb}$ on the "7" stop pin in the hundredths order. This "7" stop pin, as before described, has a lateral projection 93$^p$ which fits in an opening in the arm 93$^o$ so that when "7" stop pin in the hundredths column is raised, as before described, the "5" stop pin in the thousandths column will also be raised.

From the above it will be observed that the control of the tenths, hundredths and thousandths stop pins by the elevation of a single pin in the tenths order is such that the proper releasing posts are operated to release the tenths, hundredths, or thousandths racks required to be released to compute the decimals expressed.

What I claim is:

1. In a calculating machine, the combination of an accumulator, actuating racks therefor, a field of decimal stop pins for controlling decimal racks, and connections between said pins whereby two or more appropriate pins will be raised into operative position upon the operation of certain stop pins in the lowest decimal order.

2. In a calculating machine, the combination of an accumulator, actuating racks therefor including decimal racks, releasing means for said racks, stop pins for controlling the excursions of said racks, connections between said stop pins whereby, upon the operation of a stop pin of the lowest order, one or more stop pins of a higher order or orders will be positioned and through said releasing means one or more racks will be released according to the number of digits in the decimal, means for holding said releasing means in normal position, and means for releasing said releasing means prior to the positioning of one or more of said decimal stop pins.

In testimony whereof I hereunto affix my signature in the presence of two witnesses, this 11th day of April, 1913.

OTTO THIEME.

Witnesses:
M. P. SMITH,
C. S. BUTLER.

Copies of this patent may be obtained for five cents each, by addressing the "Commissioner of Patents Washington, D. C."